United States Patent [19]

Johansson

[11] 4,294,802

[45] Oct. 13, 1981

[54] APPARATUS FOR PARALLEL FEEDING OF SMALL VOLUMES OF FLUIDS IN SEVERAL ESSENTIALLY PARALLEL FLEXIBLE HOSES

[76] Inventor: Henry Johansson, Törevägen 28, S-741 00 Knivsta, Sweden

[21] Appl. No.: 121,534

[22] Filed: Feb. 14, 1980

[30] Foreign Application Priority Data

Feb. 27, 1979 [SE] Sweden ............................ 7901775

[51] Int. Cl.³ ............................................ G01N 1/14
[52] U.S. Cl. ..................... 422/103; 417/477; 417/510; 422/81; 422/82; 422/100; 422/63
[58] Field of Search ............... 422/81, 82, 103, 64, 422/65, 100, 63; 137/7, 9; 417/477, 510; 73/423 A, 425.4 R

[56] References Cited

U.S. PATENT DOCUMENTS

| | | | |
|---|---|---|---|
| 2,865,303 | 12/1958 | Ferrari, Jr. et al. | 417/477 X |
| 3,098,717 | 7/1963 | Ferrari, Jr. | 422/82 X |
| 3,489,525 | 1/1970 | Natelson | 422/64 |
| 3,740,173 | 6/1973 | Natelson | 417/477 X |

*Primary Examiner*—Ronald Serwin
*Attorney, Agent, or Firm*—Witherspoon & Hargest

[57] ABSTRACT

The present invention relates to an apparatus for parallel feeding of small volumes of fluids in several essentially parallel flexible hoses. The invention is characterized by a pumping bar (3) arranged essentially perpendicular to the hoses (5) and supported on and driven by an excentric in a pendulous motion, and by at least one hose clamp (1,2) operated synchronously with the pumping bar (3) for clamping the hoses (5) together when they are not influenced by the pumping bar (3).

12 Claims, 5 Drawing Figures

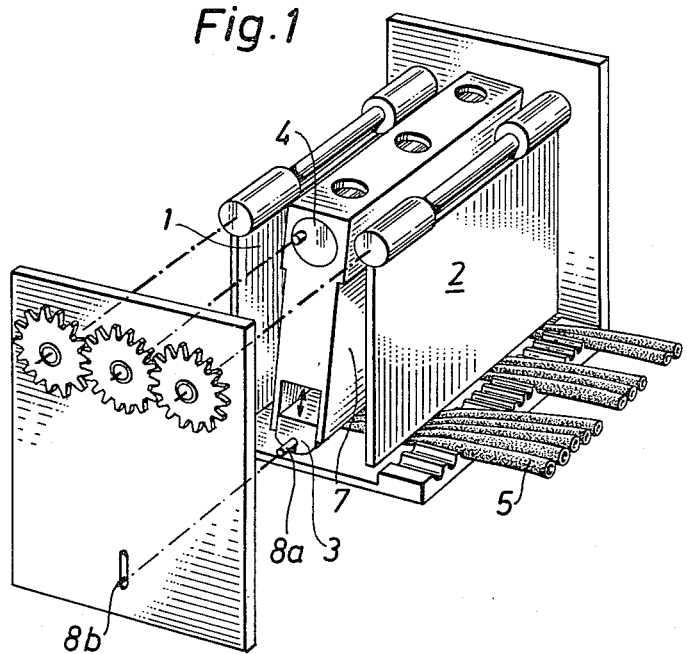
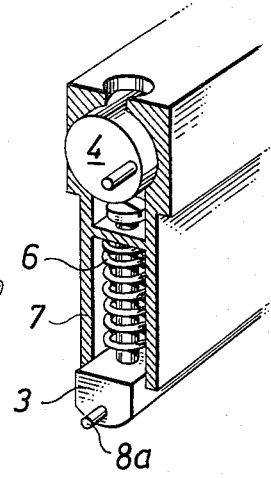
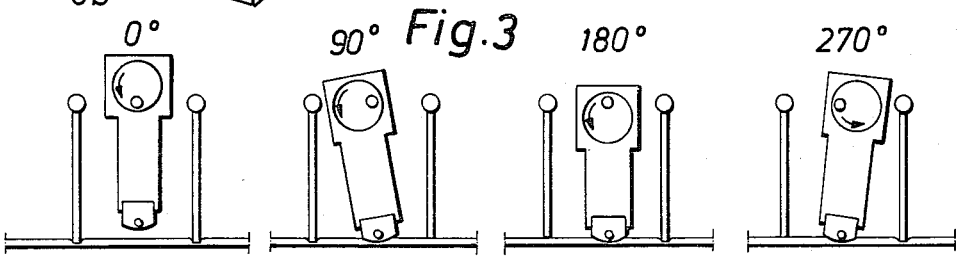
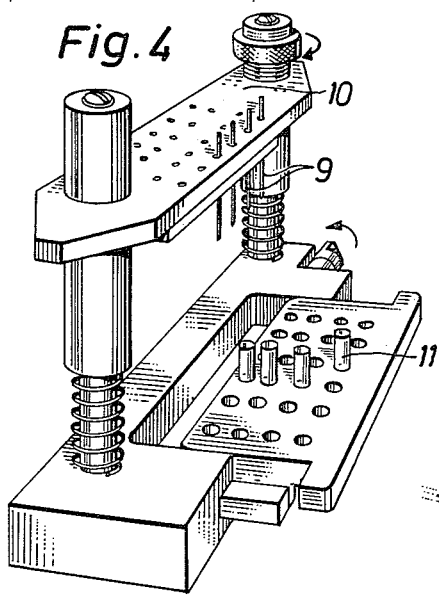
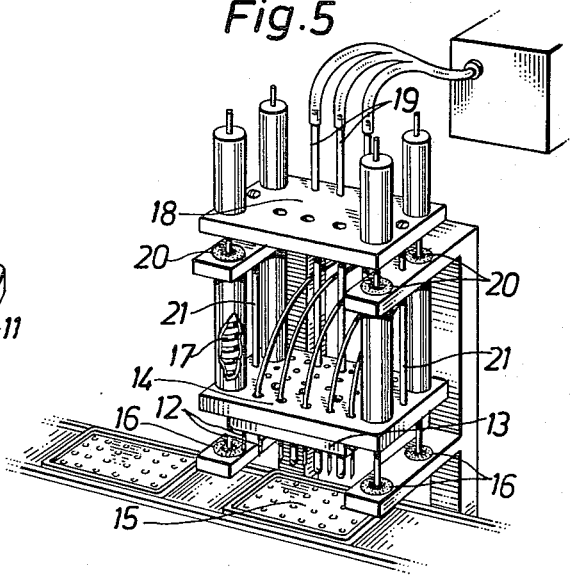

APPARATUS FOR PARALLEL FEEDING OF SMALL VOLUMES OF FLUIDS IN SEVERAL ESSENTIALLY PARALLEL FLEXIBLE HOSES

The present invention relates to an apparatus for parallel feeding of small volumes of fluids in several essentially parallel flexible hoses, for instance for feeding of several test reagents.

HLA-antigen determination or so-called tissue type determination is performed in connection with transplantations, medical diagnostics, certain foetal examinations and some legal genetic examinations. The tests are performed in the following way. White blood cells (lymphocytes) are isolated from the persons for which the HLA-type is to be determined. One $\mu$l of cell suspension is mixed with 1 $\mu$l of antisera on special test plates, which plates depending on their size contain for instance 18, 24, 45 or 60 different antisera. Cells and antisera are incubated for 30 minutes in a heating chamber with a temperature of 37° C. The tests are vital coloured and the result is read on a microscope. From the reaction pattern the HLA-antigen set of the examined person is interpreted.

In most laboratories where HLA-typed determination is performed the test plates are prepared in the laboratory itself. Antisera is put on the test plates with a micro syringe. Several syringes can be connected together and operated simultaneously. There are adaptors for both three and six syringes. Each syringe contains 50 $\mu$l and with an adaptor it delivers 1 $\mu$l reagent to each test position. Since a full syringe only is enough for 50 plates and up to 500 plates are prepared in each batch it is necessary to fill the syringe with new reagent several times. Depending on the number of test positions on each plate up to 60 diffent antisera can be present at the same time. This leads to great risks for mixing up of test sera during the preparation of the plates, which can lead to serious consequences in connection with the interpretation and estimation of the test results. The small volumes of test sera on the plates are protected against drying with a thin layer of liquid paraffin. The plates are then stored in a frozen condition until they are used. It normally takes two persons a whole working day to prepare a set of plates. Due to the long monotonous work and the risks for mixing up antisera this is a part of the work where there is a great need for simplification and/or automatization.

Thus, one object of the present invention is to simplify the work with the test plates by setting all test reagents per plate simultaneously. The problem that has to be solved consists of parallel pumping of very small volumes of liquids with great accuracy.

An apparatus for feeding small volumes of liquids is previously known from for instance Swedish Pat. No. 380.445. This specification discloses a pump comprising three cam shaft operated hose clamps arranged one after the other, which working in a certain sequence feed small volumes of liquid of the order of some twenty or thirty micro liter through the hoses. The hose clamps are operated to movement in the vertical direction by openings in a block.

An essential disadvantage in this previously known apparatus is that the amount of liquid that is pumped in each cycle is determined by the distance between the two outer hose clamps. Thus, if one wishes to pump a very small amount of liquid, for instance of the order of 1 $\mu$l, which is the case for instance in connection with the setting of test reagent on test plates, it will be necessary to position the three hose clamps so close to each other that this previously known apparatus is useless in practice. This will be further discussed in connection with the detailed description of the present invention.

Thus, the present invention relates to solving the problem with feeding of very small volumes of liquids in parallel hoses with very good accuracy.

According to the present invention this problem is solved with an apparatus with the characterizing features of the attached patent claims.

The present invention will be described in detail with reference to the attached drawings, on which FIG. 1 shows a diagrammatical view of a pump apparatus in accordance with the invention;

FIG. 2 shows a preferred embodiment of the pumping bar in the apparatus according to FIG. 1;

FIG. 3 shows a complete pumping cycle of the apparatus according to FIG. 1;

FIG. 4 shows the part of the apparatus for setting test reagent that is positioned before the pump as seen in the feeding direction; and FIG. 5 shows the part of the apparatus for setting test reagent that is positioned after the pump as seen in the feeding direction.

FIG. 1 shows a diagrammatical view of the pump apparatus according to the invention. An excentrically supported, preferably flexible or flexibly supported pumping bar 3 is provided above a set of parallel hoses 5, in which test reagent is to be pumped. The width of the pumping bar and the dimensions of hoses are chosen to deliver a predetermined amount, for instance 1 $\mu$l, of liquid in each hose for one pump stroke. The feeding direction in the hoses is determined by the movement of the pumping bar 3 and by two preferably cam shaft operated hose clamps 1 and 2, respectively. These hose clamps 1, 2 are operated synchronously with the eccentric 4 for driving the pumping bar 3. This can be accomplished for instance by a gear wheel that drives the eccentric 4 and a gear wheel on each cam shaft.

The pumping bar 3 during the rotational motion of the eccentric 4 performs a pendulum motion so that the liquid is "kneaded" through the hoses 5 in the forward direction. In order to further support this pendulum motion the bar 3 can at each end be provided with pins 8a that run in vertical slots 8b in walls arranged adjacent to the pins. Thereby the movement of the bar 3 during the rotation of the eccentric 4 will be a vertical movement on which a pendulum movement is superimposed.

FIG. 2 shows a preferred embodiment of the pump assembly. The pumping bar 3 is attached in a housing 7 by springs 6. Of course, other elastical mountings are also possible. Thus, it is for instance possible to have the housing itself or the pressure plate under the pumping bar 3 elastic.

FIG. 3 shows a complete pumping cycle. When the pumping cycle starts the two hose clamps 1 and 2, respectively, are in a pushed down position so that all hoses are closed on both sides of the pump assembly. Simultaneously with the rotation of the eccentric 4 of the pump assembly hose clamp 1 on the output side of the pump is first lifted. After a rotation of approximately 90° of the eccentric 4 the pumping bar 3 will begin to press the hoses 5 together. If the pumping bar for instance is provided with a rectangular cross section, the corner of the pumping bar lying nearest to the input side will first be pressed down against the hoses. The pumping action obtained by opening the hose clamp 2 and pressing down the bar 3 will be further amplified by the downward rotation of the bottom surface of the pumping bar during the continued rotation of the eccentric. Thus, the pumping bar will press the liquids forward in the hoses and after a rotation of the eccentric of 180° the hoses are clamped together under the pumping bar. During the rotation of the eccentric from the position 90° to the position 180° hose clamp 1 has also been opened while hose clamp 2 has been closed. After a rotation of the eccentric of 270° the pumping bar is lifted from the hoses. During this lifting the corner of the pumping bar lying nearest to the input side is lifted first, so that the suction action of the pump is further amplified. After a rotation of 330° hose clamp 1 is closed again. After the eccentric 4 has rotated a complete revolution a pump stroke is completed and the rotation is stopped. When the pump described above is intended to be used in connection with a device for setting test reagent on a plate it is conveniently combined with the devices disclosed in FIGS. 4 and 5, respectively.

In a preferred embodiment of the pump apparatus of the present invention the pumping bar 3 is provided with a convex bottom surface. During the rotation of the pumping bar from the position "90°" to the position "270°" the working point or contact point of the pumping bar 3 against the hoses 5 will move forward in the feeding direction and will thereby further support the feeding and suction.

As mentioned above it is the width of the pumping bar 3 and the dimension of the hoses 5 that in the present invention determine the amount of liquid that is pumped in each pump stroke. This means that according to the present invention it is possible to pump very small amounts of liquid, for instance of the order of 1 $\mu$l, with very high accuracy depending on the fact that the characteristic hose length for the amount of liquid that is being pumped corresponds only to the width of the pumping bar 3 and not by the distance between the outer hose clamps 1, 2, which is the case in the previously known apparatus mentioned above. For this reason it is possible to very accurately pump amounts of liquid that are at least ten times smaller than the amounts of liquid that can be pumped with the above previously known apparatus with the same accuracy.

Since the pumping bar 3 due to its eccentric mounting as a supporting action in the feeding (due to its kneading action) of the liquid it is also possible to eliminate one of the hose clamps 1 or 2. The remaining hose clamp will then close the hoses 5 during the period of time when they are not influenced by the pumping bar.

FIG. 4 shows a device that conveniently can be provided before the pump as seen in the feeding direction of the pump. The hoses leading to the pump at the input side are preferably provided with cannular tubes 9, that are mounted in a matrix 10. This matrix fits over a battery of small tubes 11 that contain test reagent. This battery or set is preferably exchangeable. The matrix 10 is preferably adjustable in the vertical direction.

FIG. 5 shows a device that conveniently can be connected after the pump disclosed above. Thin, for instance TEFLON coated cannular tubes 12 are mounted in a matrix 13 that is sitting in a frame 14 movable in the vertical direction. The test plate 15 is placed in a fixed position under this frame and the matrix is pressed down so that the cannular tubes reach the test plate. The frame is locked in this position, for instance with four electro magnets 16. The pump sequence is performed, the electro magnets are deactivated and the frame with the cannular tubes returns to its upper position by the action of springs 17.

Long cannular tubes 19 are mounted in an upper frame 18. These tubes 19 pass through holes in the lower frame 14 and the matrix 13 down to the test plate 15. A layer of liquid paraffin is distributed through these tubes 19 through the action of a pump.

The operation of the complete apparatus is the following: The test plate 15 is placed in a fixed position under the matrix 13. The frame 14 with its tubes is moved down against the test plate 15 and is locked with the magnets 16. The pump is rotated one revolution and feeds test reagent over the cannular tubes 12. The lower frame 14 is released. The second pump is activated and distributes the protection liquid (paraffin). The test plate 15 is removed and the next test plate is moved into position.

The whole process described above can be performed automatically with electric motors and electronic controls.

Test sera is produced in very small volumes which will result in a very high price per unit of volume. For this reason it is very important that the pump hoses 5 themselves contain as small volumes as possible to prevent that excessive amounts of test sera are wasted in the hoses. In order to achieve a high accuracy and prevent wasting of test sera it has been found that with an outer hose diameter of approximately 3 mm an inner hose diameter of 0.5 mm or less is preferable. For instance, in order to pump a liquid volume of 1 $\mu$l with an inner hose diameter of 0.3 mm the hose needs to be clamped by the pumping bar over a distance of approximately 14 mm. Thus, the pumping bar preferably has a width of approximately 14 mm.

In order to simultaneously clamp for instance 50 hoses of the type and dimensions mentioned above over a distance of 15 mm one needs a force of the order to 3000 N to obtain safe operation. Naturally, it is desirable to reduce this big force, especially if the pump shall have small dimensions. By giving the surface of the pumping bar that presses the hoses together a convex form in accordance with a preferred embodiment of the invention and letting this surface "roll" in the forward direction over the hoses as a wave the total pressure can be considerably reduced while the accuracy simultaneously is increased. Thus, the geometry of the surface of the pumping bar 3 that faces the hoses, the backing under the hoses and the eccentrical motion should be chosen in such a way that the necessary force is reduced to a minimum and the safe operation is maintained. In order to guarantee transport of fluid in the desired direction at least one hose clamp that closes the hoses during the period of time that they are not influenced by the pumping bar is needed, which has already been mentioned above.

In connection with distribution of liquid volumes of the order of 1 $\mu$l it is very important that the whole dose of liquid reaches the intended position. With the small volumes in question this can been achieved if the liquid dose is applied directly to the surface or location where it is intended to be with a suitable device. This object can be achieved for instance by providing the ends of the pumping hoses with a movably mounted cannular tube that has been treated in order to have a much lower adhesitivity for the liquid than the receiving surface. With a cannular tube that is rounded in the tip and coated with TEFLON this effect is obtained to a high extent.

The pump described above has been described with reference to a special field of application, namely feeding of test reagent from a set of tubes to a test plate. The pump is an extremely well operating technical solution of the problem mentioned above. Thus, entire test plates can be "set" with test reagent from a predetermined number of test glasses in a similar pump stroke. The pump delivers an extremely well defined dose to each test area on the test plate, so that very uniform test areas are obtained. In connection with the preparation of the next test plate the risk for mixing up of different test areas has been totally eliminated by the matrix form of the in- and output sides of the apparatus.

Although the pump according to the present invention has been disclosed with reference to a specific technical application it is appreciated that the pump in question also is very useful in other situations where one is interested in parallel feeding of one or several liquids in several hoses and/or when it is desirable to obtain well defined doses of one or several liquids. In this connection it is of course not necessary that the pump is stopped after each pump stroke. Instead, it is possible to have an arbitrary number of pump strokes in each pump sequence.

Furthermore, the expert appreciates that the present invention can be modified or varied in a number of ways within the scope of the invention, which is defined in the attached patent claims.

I claim:

1. Apparatus for parallel feeding of small volumes of liquids in essentially parallel flexible hoses comprising a surface over which said hoses extend during operation of said apparatus, a pumping bar extending substantially perpendicular to said surface, at least one hose clamp extending substantially perpendicular to said surface, an eccentric coupled to said pumping bar, a shaft coupled to said hose clamp, a support coupled to said eccentric and said shaft, and means coupled to said eccentric and said shaft for causing said eccentric and shaft to synchronously rotate causing said pumping bar to reciprocate in a pendulum motion towards and away from said surface for subjecting said hoses to a pumping action and said hose clamp to reciprocate towards and away from said surface for clamping said hoses together at predetermined times during the pumping cycle.

2. Apparatus according to claim 1 wherein the end of said pumping bar nearest said surface is convex towards said surface.

3. Apparatus according to claim 2 wherein said support member comprises a slot which is perpendicular to said surface and said pumping bar comprises a guiding member which extends into said slot.

4. Apparatus according to claim 2 wherein said hose clamp is positioned upstream of said pumping bar relative to said pumping action.

5. Apparatus according to claim 2 wherein said hose clamp is positioned downstream of said pumping bar relative to said pumping action.

6. Apparatus according to claim 2 wherein a first hose clamp is positioned upstream and a second hose clamp is positioned downstream, relative to said pumping action, and said downstream hose clamp reciprocates to clamp said hoses together during the first half of said pumping action and said upstream hose clamp reciprocates to clamp said hoses together during the second half of said pumping action.

7. Apparatus according to claim 1 wherein said pumping bar comprises elastic means for urging said bar towards said surface.

8. Apparatus according to claim 1 wherein said shaft is a cam shaft.

9. Apparatus according to claim 1 wherein a first gear wheel is attached to said eccentric and a second gear wheel is attached to said shaft, said gear wheels meshing such that rotation of said first gear wheel causes rotation of said second gear wheel.

10. Apparatus according to claim 1 including a plurality of first hoses extending upon said surface to be subjected to said pumping action, each of said hoses having an upstream end and a downstream end, relative to said pumping action, first matrix means comprising a plurality of first cannular tubes for suction of test reagents from test glasses during said pumping action, said first cannular tubes being attached to the upstream end of said first hoses, a second matrix means comprising a plurality of apertures through some if which extend second cannular tubes for ejecting test reagents over a test plate during said pumping action, said second cannular tubes being attached to the downstream end of said first hoses, means attached to said second matrix for moving said second matrix towards said test plate during the pumping action, and means associated with said second matrix for applying a layer of protection liquid on said test reagents on said test plate.

11. Apparatus according to claim 10 wherein said moving means comprises a first frame member having a plurality of apertures therein through some of which said first hoses extend to said second cannular tubes, and said applying means comprises a second frame member spaced from said first frame member and having a plurality of apertures therein and a plurality of third cannular tubes each of which extend through said apertures in said second frame member, through other of said apertures in said first frame member and through other of said apertures in said second matrix to said test plate, a supply member for containing said protection liquid and a plurality of second hoses one end of each of which is attached to said supply member and the other end of each of which is attached to said third cannular tubes.

12. Apparatus according to claim 11 wherein said applying means also includes a feeding apparatus of the type claimed in claim 1, said feeding apparatus positioned between said supply member and said third cannular tubes, and said second hoses extending upon the surface of said feeding apparatus to be subjected to the pumping action of said feeding apparatus.

* * * * *